(12) United States Patent
Babcock

(10) Patent No.: US 6,270,133 B1
(45) Date of Patent: Aug. 7, 2001

(54) CARPET LIFTING ASSEMBLY

(76) Inventor: Bryan K. Babcock, Rte. #1 Box #208, Vincent, OH (US) 45784

( * ) Notice: Subject to any disclaimer, the term of this patent is extended or adjusted under 35 U.S.C. 154(b) by 0 days.

(21) Appl. No.: 09/544,443

(22) Filed: Apr. 7, 2000

(51) Int. Cl.$^7$ ................................................ B65G 7/12
(52) U.S. Cl. ................................................ 294/15; 294/26
(58) Field of Search .................... 294/4, 15, 19.1, 294/26, 67.2, 167, 168, 169; 224/191, 201, 255, 265, 266

(56) References Cited

U.S. PATENT DOCUMENTS

| D. 290,033 | 5/1987 | Policastro . | |
|---|---|---|---|
| 1,205,852 | * 11/1916 | Buehler | 294/15 X |
| 2,431,780 | 12/1947 | Theal . | |
| 2,739,007 | * 3/1956 | Rauterberg | 294/15 |
| 3,583,600 | 6/1971 | Scott . | |
| 3,638,815 | 2/1972 | Fincher . | |
| 3,643,991 | * 2/1972 | Eaton | 294/15 X |
| 4,334,612 | 6/1982 | Beato . | |
| 4,496,179 | * 1/1985 | Ogle | 294/15 X |
| 4,824,313 | 4/1989 | Miller . | |
| 5,171,052 | * 12/1992 | Cunningham | 294/26 X |
| 5,234,240 | * 8/1993 | Richard | 294/15 |

FOREIGN PATENT DOCUMENTS

| 809514 | * 4/1969 | (CA) | 294/15 |
|---|---|---|---|
| 2019349 | * 11/1971 | (DE) | 294/15 |
| 2158814 | * 5/1973 | (DE) | 294/15 |

* cited by examiner

Primary Examiner—Johnny D. Cherry

(57) ABSTRACT

A carpet lifting assembly for facilitating the lifting of the end of a rolled carpet by permitting use of the shoulder while lifting. The carpet lifting assembly includes a main member, a carpet rod extending from one end of the main member, and a shoulder bar extending from an opposite end of the main member. The carpet rod is positioned in the end of a rolled carpet and the shoulder bar is supported by the shoulder of the lifter to promote lifting using the legs.

11 Claims, 4 Drawing Sheets

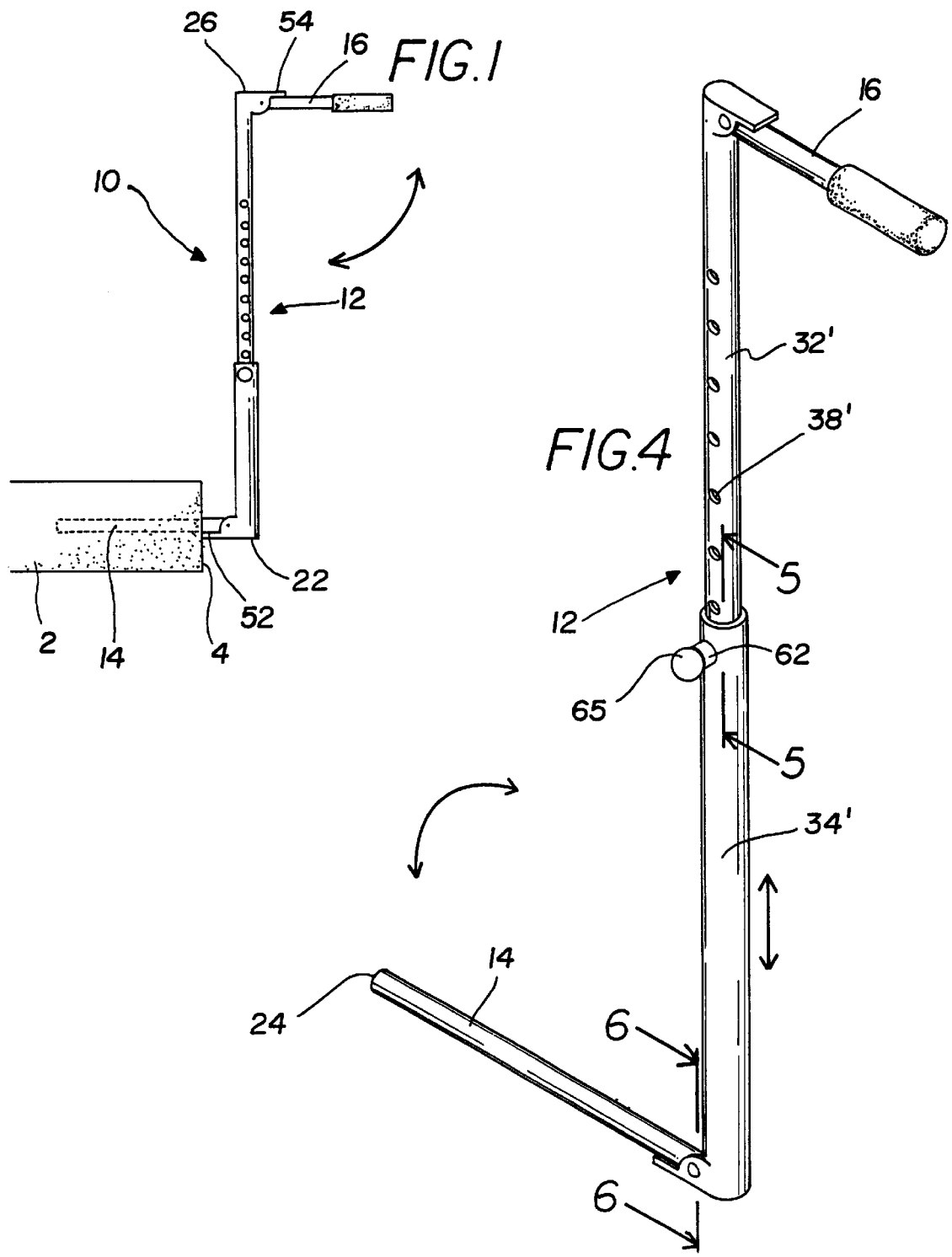

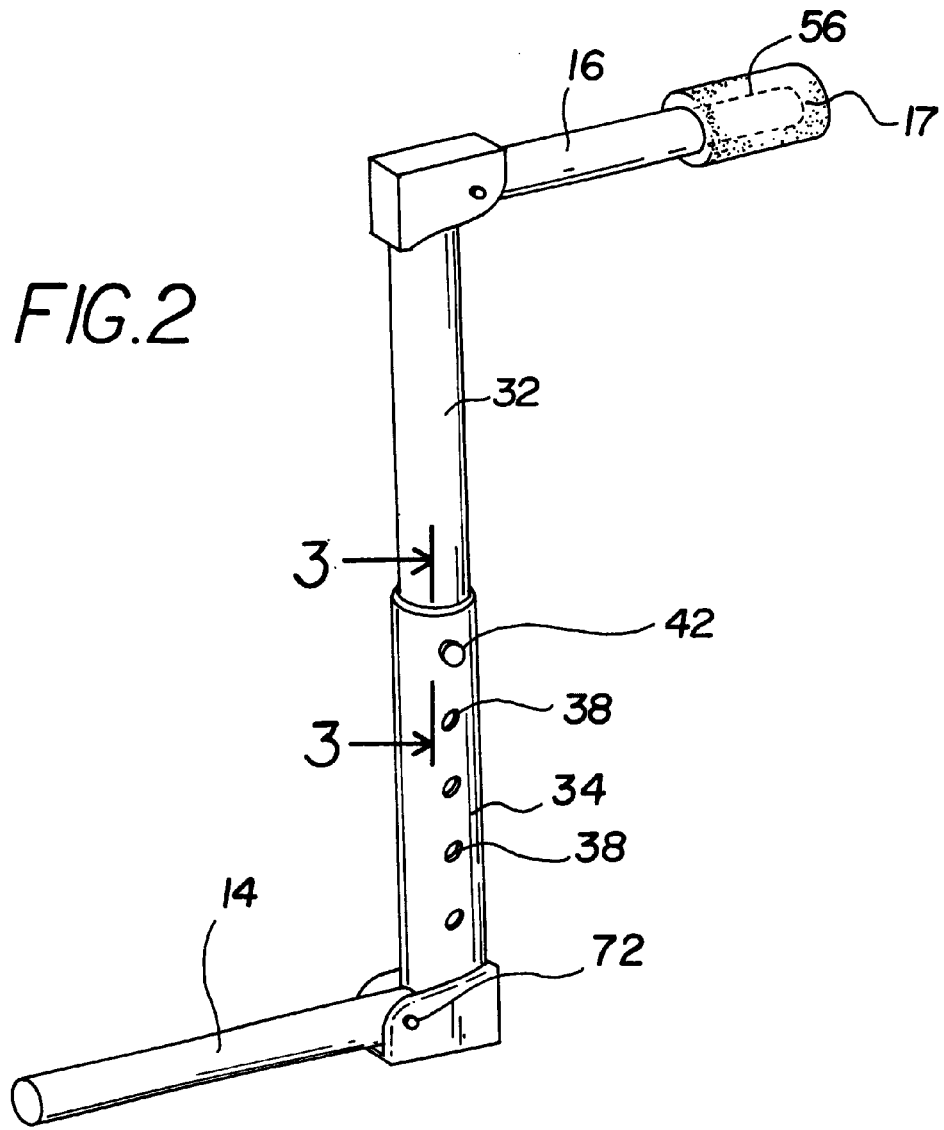
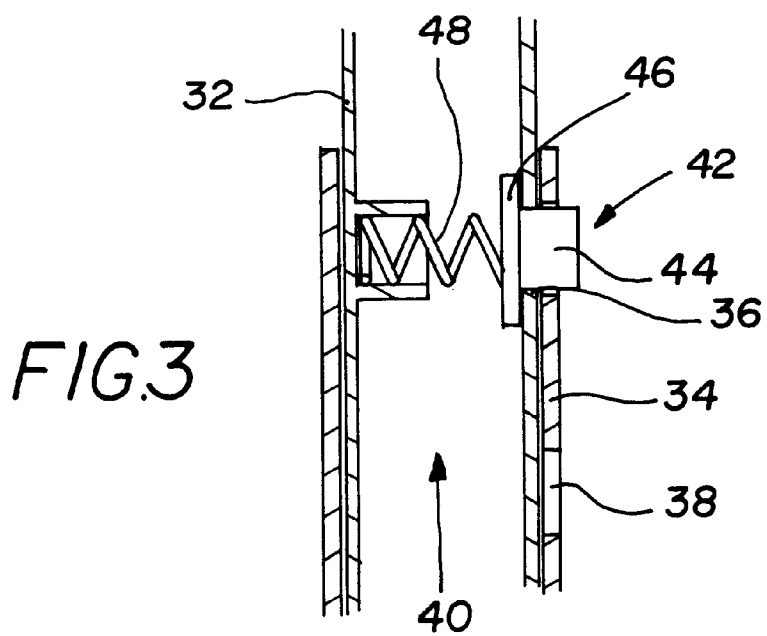

CARPET LIFTING ASSEMBLY

BACKGROUND OF THE INVENTION

1. Field of the Invention

The present invention relates to carpet lifters and more particularly pertains to a new carpet lifting assembly for facilitating the lifting of the end of a rolled carpet by permitting use of the shoulder while lifting.

2. Description of the Prior Art

The use of carpet lifters is known in the prior art. More specifically, carpet lifters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,638,815; U.S. Pat. No. 4,824,313; U.S. Pat. No. 2,431,780; U.S. Pat. No. 4,334,612; U.S. Pat. No. 3,583,600; and U.S. Pat. No. Des. 290,033.

While these devices fulfill their respective, particular objectives and requirements, the aforementioned patents do not disclose a new carpet lifting assembly. The inventive device includes a main member, a carpet rod extending from one end of the main member, and a shoulder bar extending from an opposite end of the main member. The carpet rod is positioned in the end of a rolled carpet and the shoulder bar is supported by the shoulder of the lifter to promote lifting using the legs.

In these respects, the carpet lifting assembly according to the present invention substantially departs from the conventional concepts and designs of the prior art, and in so doing provides an apparatus primarily developed for the purpose of facilitating the lifting of the end of a rolled carpet by permitting use of the shoulder while lifting.

SUMMARY OF THE INVENTION

In view of the foregoing disadvantages inherent in the known types of carpet lifters now present in the prior art, the present invention provides a new carpet lifting assembly construction wherein the same can be utilized for facilitating the lifting of the end of a rolled carpet by permitting use of the shoulder while lifting.

The general purpose of the present invention, which will be described subsequently in greater detail, is to provide a new carpet lifting assembly apparatus and method which has many of the advantages of the carpet lifters mentioned heretofore and many novel features that result in a new carpet lifting assembly which is not anticipated, rendered obvious, suggested, or even implied by any of the prior art carpet lifters, either alone or in any combination thereof.

To attain this, the present invention generally comprises a main member, a carpet rod extending from one end of the main member, and a shoulder bar extending from an opposite end of the main member. The carpet rod is positioned in the end of a rolled carpet and the shoulder bar is supported by the shoulder of the lifter to promote lifting using the legs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new carpet lifting assembly apparatus and method which has many of the advantages of the carpet lifters mentioned heretofore and many novel features that result in a new carpet lifting assembly which is not anticipated, rendered obvious, suggested, or even implied by any of the prior art carpet lifters, either alone or in any combination thereof.

It is another object of the present invention to provide a new carpet lifting assembly that may be easily and efficiently manufactured and marketed.

It is a further object of the present invention to provide a new carpet lifting assembly that is of a durable and reliable construction.

An even further object of the present invention is to provide a new carpet lifting assembly which is susceptible of a low cost of manufacture with regard to both materials and labor, and which accordingly is then susceptible of low prices of sale to the consuming public, thereby making such carpet lifting assembly economically available to the buying public.

Still yet another object of the present invention is to provide a new carpet lifting assembly which provides in the apparatuses and methods of the prior art some of the advantages thereof, while simultaneously overcoming some of the disadvantages normally associated therewith.

Still another object of the present invention is to provide a new carpet lifting assembly for facilitating the lifting of the end of a rolled carpet by permitting use of the shoulder while lifting.

Yet another object of the present invention is to provide a new carpet lifting assembly which includes a main member, a carpet rod extending from one end of the main member, and a shoulder bar extending from an opposite end of the main member. The carpet rod is positioned in the end of a rolled carpet and the shoulder bar is supported by the shoulder of the lifter to promote lifting using the legs.

Still yet another object of the present invention is to provide a new carpet lifting assembly that facilitates lifting using the legs as opposed to the arms and back.

Even still another object of the present invention is to provide a new carpet lifting assembly that maintains proper back alignment during lifting to prevent back injury.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new carpet lifting assembly according to the present invention.

FIG. 2 is a perspective view of the present invention.

FIG. 3 is a cross-sectional view of the present invention taken along line 3—3 of FIG. 2.

FIG. 4 is perspective view of an alternate embodiment of the invention.

DESCRIPTION OF THE PREFERRED EMBODIMENT

Figure 5:
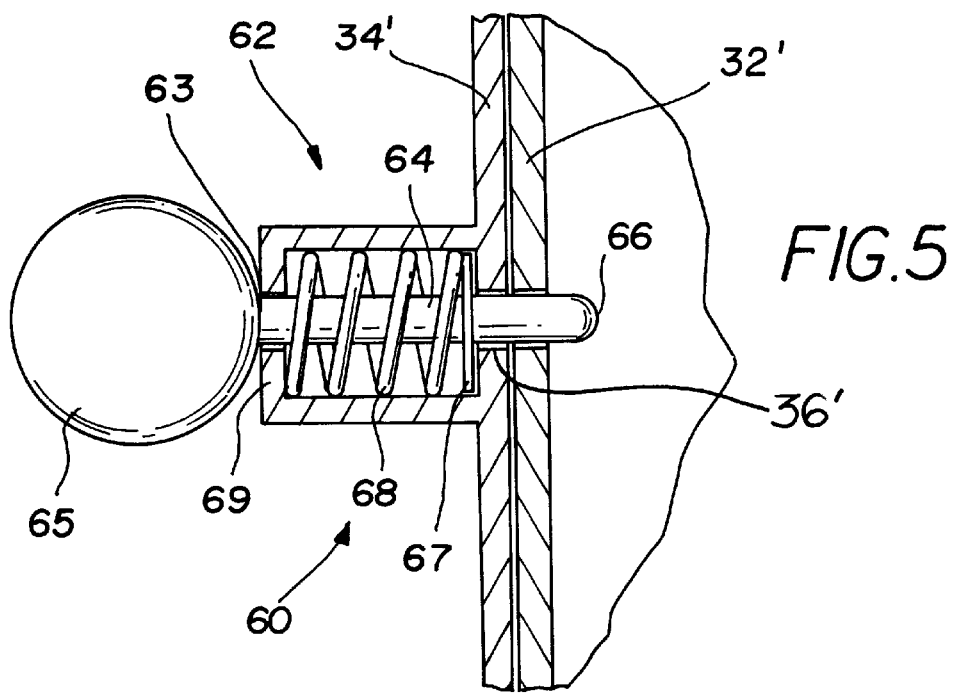
FIG. 5 is a cross-sectional view of the alternate embodiment taken along line 5—5 of FIG. 4.
Figure 6:
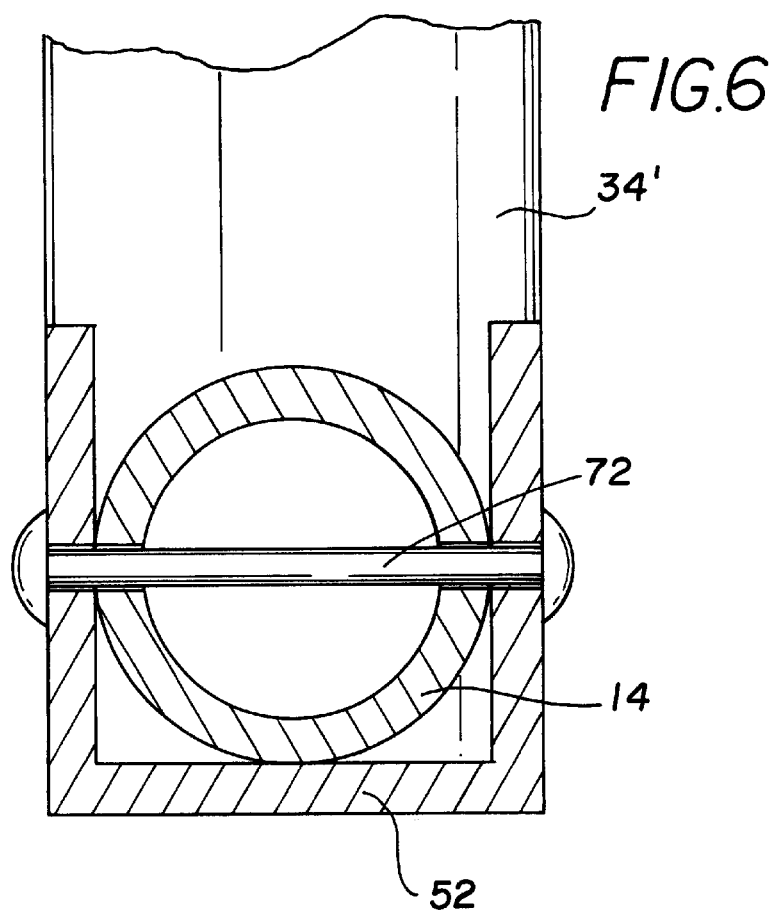
FIG. 6 is a cross-sectional view of the present invention taken along line 6—6 of FIG. 4.

With reference now to the drawings, and in particular to FIGS. 1 through 6 thereof, a new carpet lifting assembly embodying the principles and concepts of the present invention and generally designated by the reference numeral 10 will be described.

As best illustrated in FIGS. 1 through 6, the carpet lifting assembly 10 generally comprises a main member 12, a carpet rod 14, and a shoulder bar 16.

The carpet rod 14 is coupled to the first end 22 of the main member 12 and extends outwardly from the main member 12 such that a distal end 24 of the carpet rod 14 is designed for insertion into an end 4 of a rolled carpet 2 for facilitating lifting of the end 4 of the rolled carpet 2.

The shoulder bar 16 is coupled to the second end 26 of the main member 12 and is designed for being supported by a user's shoulder whereby the shoulder bar 16 is designed for facilitating lifting of the end 4 of the rolled carpet 2 by the user.

In an embodiment, the carpet rod 14 is pivotally coupled to the main member 12 by a pivot axle 72 and is pivotable between a use position and a storage position. The use position is defined by the carpet rod 14 extending substantially orthogonal to the main member 12 and the storage position is defined by a longitudinal axis of the carpet rod 14 being positioned to extend substantially parallel to a longitudinal axis of the main member 12.

In an embodiment, the shoulder bar 16 is pivotally coupled to the main member 12 and is pivotable between an open position and a closed position. The open position is defined by the shoulder bar 16 extending substantially orthogonal to the main member 12 and the closed position is defined by a longitudinal axis of the shoulder bar 16 being positioned to extend substantially parallel to a longitudinal axis of the main member 12.

In an embodiment, the main member is telescopic. The main member includes an inner sleeve 32 and an outer sleeve 34. The inner sleeve 32 is slidable within the outer sleeve 34. The inner sleeve 32 includes a hole 36 and the outer sleeve 34 includes a plurality of apertures 38. The apertures 38 are spaced along a length of the outer sleeve 34. Each of the apertures 38 is alignable with the hole 36 of the inner sleeve 32 for adjusting a length of the main member 12.

A pin assembly 40 is insertable through the hole 36 and an aligned one of the apertures 38 for holding the outer sleeve 34 in a static position relative to the inner sleeve 32.

A carpet rod stop 52 extends outwardly from the first end 22 of the main member proximate the carpet rod 14. The carpet rod stop 52 is positioned to prevent the carpet rod 14 from pivoting past a right angle with respect to the main member 12.

A shoulder bar stop 54 extends outwardly from the second end 26 of the main member 12 proximate the shoulder bar 16. The shoulder bar stop 54 is positioned to prevent the shoulder bar 16 from pivoting past a right angle with respect to the main member 12.

The pin assembly 40 includes a stop member 42 coupled to the inner sleeve 32. The stop member 42 includes a main portion 44 insertable through the hole 36 and a selectable one of the apertures 38 in the outer sleeve 34. The stop member 42 also includes a flange portion 46 extending outwardly from the main portion 44 for preventing the stop member 42 from passing entirely through the hole 36. A biasing member 48 is coupled to the stop member 42 for biasing the main portion 44 of the stop member 42 outwardly through the hole 36 in the inner sleeve 32 to engage the selected one of the apertures 38 in the outer sleeve 34. Thus, the outer sleeve 34 is held in a static position with respect to the inner sleeve 32. The stop member 42 is depressible such that a distal end 43 of the main portion 44 of the stop member 42 is positioned substantially flush with an outer surface 33 of the inner sleeve 32. Thus the inner sleeve 32 is slidable within the outer sleeve 34 for adjusting the length of the main member 12.

In an embodiment, a shoulder pad 56 is coupled to a distal end 17 of the shoulder bar 16.

In an alternate embodiment, the main member 12 is telescopic and includes an inner sleeve 32' and an outer sleeve 34'. The outer sleeve 34' includes a hole 36'. The inner sleeve 32' includes a plurality of apertures 38', the apertures 38' being spaced along a length of the inner sleeve 32'. Each of the apertures 38' is alignable with the hole 36' of the outer sleeve 34' for adjusting a length of the main member 12. A pin assembly 60 is insertable through the hole 36' and an aligned one of the apertures 38' for holding the outer sleeve 34' in a static position relative to the inner sleeve 32'.

The outer sleeve 34' includes a pin assembly housing 62 aligned with the hole 36'. A pin 64 extends through the pin assembly housing 62. A first end 63 of the pin 64 includes a handle 65 and a distal end 66 of the pin extends through the hole 36' in the outer sleeve 34'.

The pin 64 includes a flange 67 positioned within the pin assembly housing 62. The flange 67 extends radially outward from the pin 64 and is spaced from the distal end 66 of the pin 64 for permitting the distal end 66 to extend through the hole 36' and a selectable one of the plurality of apertures 38' in the inner sleeve 32'. A biasing member 68 is positioned between an end wall 69 of the pin assembly housing 62 and the flange 67 for biasing the distal end 66 of the pin 64 through the hole 36' and a selected one of the apertures 38' in the inner sleeve 32'. The biasing member 68 is compressible such that the distal end of the pin 66 is withdrawable from the selected one of the apertures 38' for permitting sliding of the inner sleeve 32' within the outer sleeve 34' for adjusting the length of the main member 12.

Figure 7:
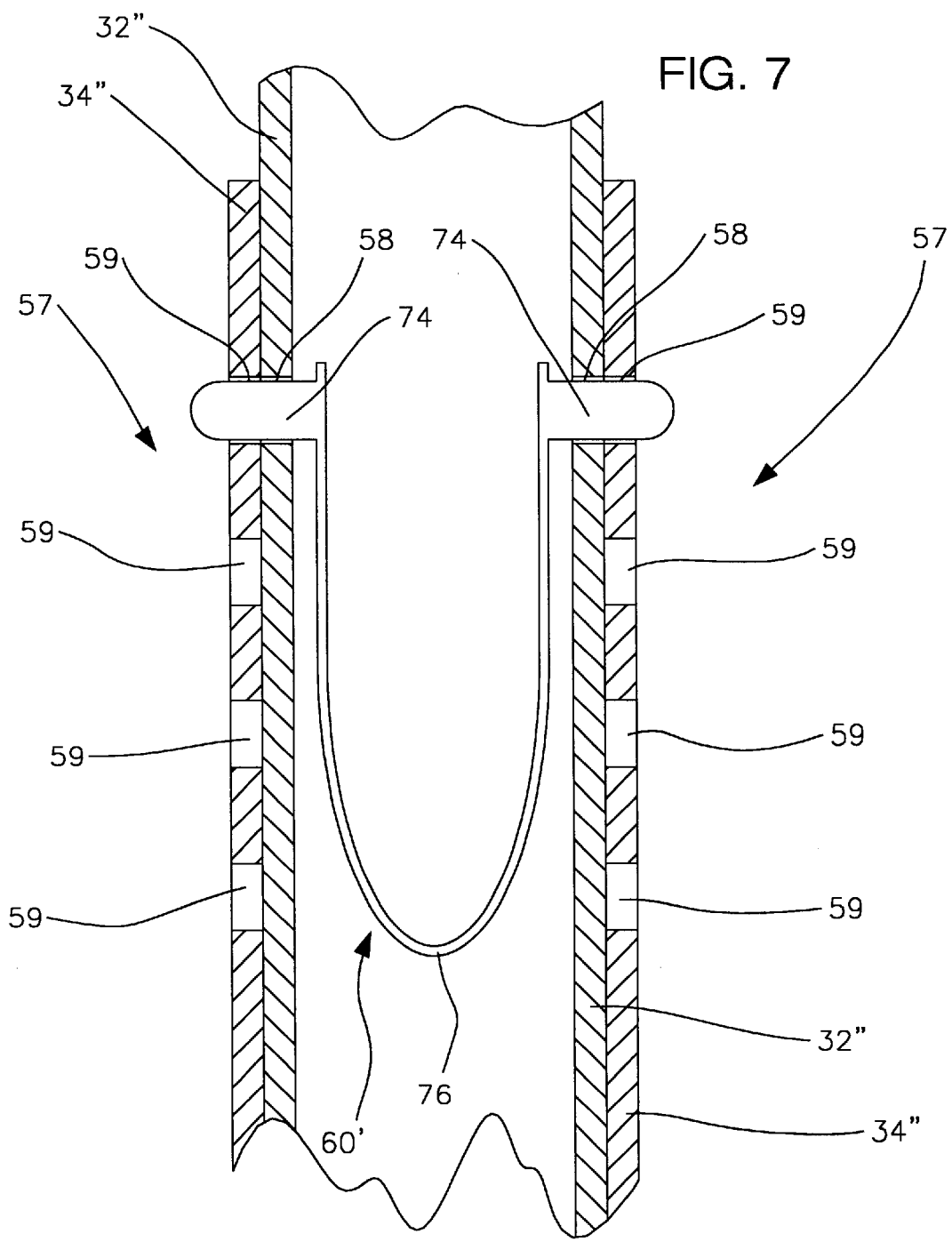
FIG. 7 is a cut-away view of an alternate embodiment of the present invention.

In an embodiment shown in FIG. 7, the main member 12 is telescopic and includes an inner sleeve 32" and an outer sleeve 34". The inner sleeve 32" is slidable within the outer sleeve 34". The inner sleeve 32" includes a pair of aligned holes 58. The outer sleeve includes a plurality of apertures 59 configured into a pair of aperture rows 57. The aperture rows 57 are spaced along a length of the outer sleeve 34". A selectable pair of opposing apertures 59 are alignable with the holes 58 for adjusting a length of the main member 12. The pin assembly 60' includes a pair of pins 74 and an arcuate medial portion 76 extending between the pair of pins 74 for resiliently biasing the pair of pins 74 outwardly. Each of the pins 74 is insertable through an associated hole 58 and an associated one of the selectable apertures 59. Thus, the inner sleeve 32" is held in a static position relative to the outer sleeve 34".

In use, the shoulder bar 16 and the carpet rod 14 are positioned to extend from the main member 12. The carpet rod 14 is inserted into the rolled carpet 2 and the shoulder bar 16 is positioned over the shoulder of a crouched user. The user can then support the shoulder bar 16 with the shoulder and stand up to lift the rolled carpet. In use, one carpet lifting assembly 10 would be used at each end of the rolled carpet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A carpet lifting assembly for lifting a rolled carpet, the lifting assembly comprising:
   a main member;
   a carpet rod coupled to a first end of said main member, said carpet rod extending outwardly from said main member such that a distal end of said carpet rod is insertable into an end of the rolled carpet for facilitating lifting of the end of the rolled carpet;
   a shoulder bar coupled to a second end of said main member, said shoulder bar being supportable by a user's shoulder whereby said shoulder bar facilitates lifting of the end of the rolled carpet by the user;
   said carpet rod being pivotally coupled to said main member, said carpet rod being pivotable between a use position and a storage position, said use position being defined by said carpet rod extending substantially orthogonal to said main member, said storage position being defined by a longitudinal axis of said carpet rod being positioned to extend substantially parallel to a longitudinal axis of said main member; and
   a carpet rod stop extending outwardly from said first end of said main member proximate said carpet rod, said carpet rod stop being positioned to prevent said carpet rod from pivoting past a right angle with respect to said main member.

2. The carpet lifting assembly of claim 1, further comprising:
   said shoulder bar being pivotally coupled to said main member, said shoulder bar being pivotable between an open position and a closed position, said open position being defined by said shoulder bar extending substantially orthogonal to said main member, said closed position being defined by a longitudinal axis of said shoulder bar being positioned to extend substantially parallel to a longitudinal axis of said main member.

3. The carpet lifting assembly of claim 1, further comprising:
   said main member being telescopic, said main member including an inner sleeve and an outer sleeve, said inner sleeve being slidable within said outer sleeve, said inner sleeve having a hole, said outer sleeve having a plurality of apertures, said apertures being spaced along a length of said outer sleeve, each of said apertures being alignable with said hole of said inner sleeve for adjusting a length of said main member; and
   a pin assembly insertable through said hole and an aligned one of said apertures for holding said outer sleeve in a static position relative to said inner sleeve.

4. The carpet lifting assembly of claim 1, further comprising:
   a shoulder pad coupled to a distal end of said shoulder bar.

5. The carpet lifting assembly of claim 1, further comprising:
   said main member being telescopic, said main member including an inner sleeve and an outer sleeve, said inner sleeve being slidable within said outer sleeve, said outer sleeve having a hole, said inner sleeve having a plurality of apertures, said apertures being spaced along a length of said inner sleeve, each of said apertures being alignable with said hole of said outer sleeve for adjusting a length of said main member; and
   a pin assembly insertable through said hole and an aligned one of said apertures for holding said outer sleeve in a static position relative to said inner sleeve.

6. The carpet lifting assembly of claim 1, further comprising:
   said shoulder bar being pivotally coupled to said main member, said shoulder bar being pivotable between an open position and a closed position, said open position being defined by said shoulder bar extending substantially orthogonal to said main member, said closed position being defined by a longitudinal axis of said shoulder bar being positioned to extend substantially parallel to a longitudinal axis of said main member;
   said main member being telescopic, said main member including an inner sleeve and an outer sleeve, said inner sleeve being slidable within said outer sleeve, said inner sleeve having a hole, said outer sleeve having a plurality of apertures, said apertures being spaced along a length of said outer sleeve, each of said apertures being alignable with said hole of said inner sleeve for adjusting a length of said main member;

a pin assembly insertable through said hole and an aligned one of said apertures for holding said outer sleeve in a static position relative to said inner sleeve;

a shoulder bar stop extending outwardly from said second end of said main member proximate said shoulder bar, said shoulder bar stop being positioned to prevent said shoulder bar from pivoting past a right angle with respect to said main member;

wherein said pin assembly includes
 a stop member coupled to said inner sleeve, said stop member having a main portion insertable through said hole and a selectable one of said apertures in said outer sleeve, said stop member having a flange portion extending outwardly from said main portion for preventing said stop member from passing entirely through said hole,
 a biasing member coupled to said stop member for biasing said main portion of said stop member outwardly through said hole in said inner sleeve to engage said selectable one of said apertures in said outer sleeve whereby said outer sleeve is held in a static position with respect to said inner sleeve, and
 wherein said stop member is depressible such that a distal end of said main portion of said stop member is positioned substantially flush with an outer surface of said inner sleeve whereby said inner sleeve is slidable within said outer sleeve for adjusting said length of said main member; and a shoulder pad coupled to a distal end of said shoulder bar.

7. The carpet lifting assembly of claim 1, further comprising:

said main member being telescopic, said main member including an inner sleeve and an outer sleeve, said inner sleeve being slidable within said outer sleeve, said inner sleeve having a pair of aligned holes, said outer sleeve having a plurality of apertures configured into a pair of aperture rows, said aperture rows being spaced along a length of said outer sleeve, a selectable pair of opposing apertures being alignable with said holes of said inner sleeve for adjusting a length of said main member; and a pin assembly insertable through said holes and said selectable pair of said apertures for holding said outer sleeve in a static position relative to said inner sleeve.

8. A carpet lifting assembly for lifting a rolled carpet, the lifting assembly comprising:

a main member;

a carpet rod coupled to a first end of said main member, said carpet rod extending outwardly from said main member such that a distal end of said carpet rod is insertable into an end of the rolled carpet for facilitating lifting of the end of the rolled carpet;

a shoulder bar coupled to a second end of said main member, said shoulder bar being supportable by a user's shoulder whereby said shoulder bar facilitates lifting of the end of the rolled carpet by the user;

said shoulder bar being pivotally coupled to said main member, said shoulder bar being pivotable between an open position and a closed position, said open position being defined by said shoulder bar extending substantially orthogonal to said main member, said closed position being defined by a longitudinal axis of said shoulder bar being positioned to extend substantially parallel to a longitudinal axis of said main member; and a shoulder bar stop extending outwardly from said second end of said main member proximate said shoulder bar, said shoulder bar stop being positioned to prevent said shoulder bar from pivoting past a right angle with respect to said main member.

9. A carpet lifting assembly for lifting a rolled carpet, the lifting assembly comprising:

a main member;

a carpet rod coupled to a first end of said main member, said carpet rod extending outwardly from said main member such that a distal end of said carpet rod is insertable into an end of the rolled carpet for facilitating lifting of the end of the rolled carpet;

a shoulder bar coupled to a second end of said main member, said shoulder bar being supportable by a user's shoulder whereby said shoulder bar facilitates lifting of the end of the rolled carpet by the user;

said main member being telescopic, said main member including an inner sleeve and an outer sleeve, said inner sleeve being slidable within said outer sleeve, said inner sleeve having a hole, said outer sleeve having a plurality of apertures, said apertures being spaced along a length of said outer sleeve, each of said apertures being alignable with said hole of said inner sleeve for adjusting a length of said main member;

a pin assembly insertable through said hole and an aligned one of said apertures for holding said outer sleeve in a static position relative to said inner sleeve;

a stop member coupled to said inner sleeve, said stop member having a main portion insertable through said hole and a selectable one of said apertures in said outer sleeve, said stop member having a flange portion extending outwardly from said main portion for preventing said stop member from passing entirely through said hole;

a biasing member coupled to said stop member for biasing said main portion of said stop member outwardly through said hole in said inner sleeve to engage said selectable one of said apertures in said outer sleeve whereby said outer sleeve is held in a static position with respect to said inner sleeve; and wherein said stop member is depressible such that a distal end of said main portion of said stop member is positioned substantially flush with an outer surface of said inner sleeve whereby said inner sleeve is slidable within said outer sleeve for adjusting said length of said main member.

10. A carpet lifting assembly for lifting a rolled carpet, the lifting assembly comprising:

a main member;

a carpet rod coupled to a first end of said main member, said carpet rod extending outwardly from said main member such that a distal end of said carpet rod is insertable into an end of the rolled carpet for facilitating lifting of the end of the rolled carpet;

a shoulder bar coupled to a second end of said main member, said shoulder bar being supportable by a user's shoulder whereby said shoulder bar facilitates lifting of the end of the rolled carpet by the user;

said main member being telescopic, said main member including an inner sleeve and an outer sleeve, said inner sleeve being slidable within said outer sleeve, said outer sleeve having a hole, said inner sleeve having a plurality of apertures, said apertures being spaced along a length of said inner sleeve, each of said apertures being alignable with said hole of said outer sleeve for adjusting a length of said main member;

a pin assembly insertable through said hole and an aligned one of said apertures for holding said outer sleeve in a static position relative to said inner sleeve;

said outer sleeve having a pin assembly housing aligned with said hole;

a pin extending through said pin assembly housing, a first end of said pin having a handle, a distal end of said pin extending through said hole in said outer sleeve;

said pin having a flange positioned within said pin assembly housing and extending radially outward from said pin, said flange being spaced from said distal end of said pin for permitting said distal end to extend through said hole and a selectable one of said plurality of apertures in said inner sleeve; and a biasing member positioned between an end wall of said pin assembly housing and said flange for biasing said distal end of said pin through said hole and a selected one of said apertures in said inner sleeve, said biasing member being compressible such that said distal end of said pin is withdrawable from said selected one of said apertures for permitting sliding of said inner sleeve within said outer sleeve for adjusting said length of said main member.

11. A carpet lifting assembly for lifting a rolled carpet, the lifting assembly comprising:

a main member;

a carpet rod coupled to a first end of said main member, said carpet rod extending outwardly from said main member such that a distal end of said carpet rod is insertable into an end of the rolled carpet for facilitating lifting of the end of the rolled carpet;

a shoulder bar coupled to a second end of said main member, said shoulder bar being supportable by a user's shoulder whereby said shoulder bar facilitates lifting of the end of the rolled carpet by the user;

said main member being telescopic, said main member including an inner sleeve and an outer sleeve, said inner sleeve being slidable within said outer sleeve, said inner sleeve having a pair of aligned holes, said outer sleeve having a plurality of apertures configured into a pair of aperture rows, said aperture rows being spaced along a length of said outer sleeve, a selectable pair of opposing apertures being alignable with said holes of said inner sleeve for adjusting a length of said main member;

a pin assembly insertable through said holes and said selectable pair of said apertures for holding said outer sleeve in a static position relative to said inner sleeve; and said pin assembly including a pair of pins and an arcuate medial portion extending between said pair of pins for resiliently biasing said pair of pins outwardly, each of said pins being insertable through an associated hole and an associated one of said selectable apretures whereby said inner sleeve is held in a static position relative to said outer sleeve.

* * * * *